(12) United States Patent
Barwicz et al.

(10) Patent No.: US 9,206,965 B2
(45) Date of Patent: Dec. 8, 2015

(54) SEMICONDUCTOR PHOTONIC PACKAGE

(71) Applicant: International Business Machines Corporation, Armonk, NY (US)

(72) Inventors: Tymon Barwicz, Yorktown Heights, NY (US); Paul F. Fortier, Richelieu (CA); Stephane G. Harel, Grandby (CA); Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/969,948

(22) Filed: Aug. 19, 2013

(65) Prior Publication Data

US 2014/0179034 A1    Jun. 26, 2014

Related U.S. Application Data

(63) Continuation of application No. 13/721,833, filed on Dec. 20, 2012.

(51) Int. Cl.
*G02B 6/42*   (2006.01)
*F21V 21/00*  (2006.01)

(52) U.S. Cl.
CPC ............. *F21V 21/00* (2013.01); *G02B 6/4202* (2013.01); *G02B 6/424* (2013.01)

(58) Field of Classification Search
CPC .. G02B 6/4202; G02B 6/4245; H05K 13/046; H05K 13/0465
See application file for complete search history.

(56) References Cited

U.S. PATENT DOCUMENTS

| | | | | |
|---|---|---|---|---|
| 5,071,213 A | * | 12/1991 | Chan | 385/52 |
| 5,319,725 A | * | 6/1994 | Buchmann et al. | 385/14 |
| 5,343,544 A | | 8/1994 | Boyd et al. | |
| 5,375,184 A | | 12/1994 | Sullivan | |
| 5,432,878 A | * | 7/1995 | Smous | 385/52 |
| 5,499,312 A | | 3/1996 | Hahn et al. | |
| 5,625,730 A | | 4/1997 | Ishikawa et al. | |
| 5,671,315 A | | 9/1997 | Tabuchi et al. | |
| 6,097,871 A | | 8/2000 | De Dobbelaere et al. | |
| 6,108,472 A | * | 8/2000 | Rickman et al. | 385/48 |
| 6,157,759 A | | 12/2000 | Seo et al. | |
| 6,241,399 B1 | | 6/2001 | Nobuhara | |

(Continued)

FOREIGN PATENT DOCUMENTS

| | | |
|---|---|---|
| CN | 101702048 A | 5/2010 |
| CN | 102084277 A | 6/2011 |

(Continued)

OTHER PUBLICATIONS

A. Kumar et al., "Birefringence of optical fiber pressed into a V groove," Optics Letters, Dec. 1981, vol. 6, Issue 12, 1981, pp. 644-646.

(Continued)

*Primary Examiner* — Rhonda Peace
(74) *Attorney, Agent, or Firm* — Cantor Colburn LLP; Vazken Alexanian

(57) ABSTRACT

A method for assembling a semiconductor photonic package device includes bonding a portion of a first surface of a semiconductor die portion to a portion of a carrier portion, bonding a single mode optical ferrule portion to a portion of the first surface of the semiconductor die portion, and disposing a cover plate assembly in contact with the optical ferrule portion and the carrier portion.

10 Claims, 9 Drawing Sheets

(56) References Cited

U.S. PATENT DOCUMENTS

| | | | |
|---|---|---|---|
| 6,257,772 B1 | 7/2001 | Nakanishi et al. | |
| 6,415,082 B1 | 7/2002 | Wach | |
| 6,470,117 B1 | 10/2002 | Tang et al. | |
| 6,504,107 B1 | 1/2003 | Kragl | |
| 6,517,257 B2 | 2/2003 | Nishikawa et al. | |
| 6,553,173 B1 | 4/2003 | Goto | |
| 6,631,228 B2 | 10/2003 | Gao et al. | |
| 6,709,607 B2 | 3/2004 | Hibbs-Brenner et al. | |
| 6,741,776 B2 | 5/2004 | Iwashita et al. | |
| 6,780,944 B1 | 8/2004 | Miura et al. | |
| 6,786,654 B2 * | 9/2004 | Kilian | 385/94 |
| 6,860,642 B2 | 3/2005 | Vodrahalli et al. | |
| 6,976,792 B1 | 12/2005 | Cohen et al. | |
| 7,058,275 B2 | 6/2006 | Sezerman et al. | |
| 7,095,928 B2 * | 8/2006 | Blauvelt et al. | 385/49 |
| 7,197,224 B2 | 3/2007 | Rolston et al. | |
| 7,223,025 B2 | 5/2007 | Benzoni et al. | |
| 7,254,301 B2 | 8/2007 | Hoshino et al. | |
| 7,292,756 B2 | 11/2007 | Moynihan et al. | |
| 7,345,316 B2 | 3/2008 | Sherrer et al. | |
| 7,404,680 B2 * | 7/2008 | Ono et al. | 385/88 |
| 7,454,098 B1 | 11/2008 | Lamprecht et al. | |
| 7,477,813 B2 | 1/2009 | Monma et al. | |
| 7,488,119 B2 | 2/2009 | Yoshida et al. | |
| 7,492,995 B2 | 2/2009 | Kuroda et al. | |
| 7,616,852 B2 | 11/2009 | Ohtsu et al. | |
| 7,729,581 B2 * | 6/2010 | Rolston et al. | 385/52 |
| 7,738,753 B2 | 6/2010 | Assefa et al. | |
| 7,779,158 B2 | 8/2010 | Ohhira | |
| 7,794,158 B2 | 9/2010 | Yasuda et al. | |
| 8,231,284 B2 * | 7/2012 | Doany et al. | 385/92 |
| 8,313,252 B2 | 11/2012 | Sameshima et al. | |
| 8,320,721 B2 | 11/2012 | Cevini et al. | |
| 8,534,927 B1 | 9/2013 | Barwicz et al. | |
| 8,545,108 B1 | 10/2013 | Barwicz et al. | |
| 8,724,937 B2 | 5/2014 | Barwicz et al. | |
| 2001/0004369 A1 * | 6/2001 | Miyokawa et al. | 372/36 |
| 2002/0037138 A1 * | 3/2002 | Kaneko et al. | 385/49 |
| 2002/0106165 A1 | 8/2002 | Arsenault et al. | |
| 2002/0114577 A1 | 8/2002 | Kondo et al. | |
| 2002/0181877 A1 | 12/2002 | Van Eck | |
| 2002/0181882 A1 | 12/2002 | Hibbs-Brenner et al. | |
| 2003/0007754 A1 | 1/2003 | Terashima | |
| 2003/0133688 A1 | 7/2003 | Leung et al. | |
| 2004/0016933 A1 * | 1/2004 | Mori et al. | 257/80 |
| 2004/0022487 A1 | 2/2004 | Nagasaka et al. | |
| 2004/0028314 A1 | 2/2004 | Lee et al. | |
| 2004/0218849 A1 * | 11/2004 | Blauvelt et al. | 385/14 |
| 2005/0013557 A1 * | 1/2005 | Lu | 385/90 |
| 2005/0082552 A1 * | 4/2005 | Fang et al. | 257/81 |
| 2005/0163416 A1 | 7/2005 | Yamada et al. | |
| 2005/0180696 A1 | 8/2005 | Takahashi et al. | |
| 2005/0238290 A1 | 10/2005 | Choudhury et al. | |
| 2005/0254770 A1 | 11/2005 | Watanabe | |
| 2006/0067624 A1 * | 3/2006 | Towle et al. | 385/49 |
| 2006/0291793 A1 | 12/2006 | Carpenter et al. | |
| 2007/0003205 A1 | 1/2007 | Saravanos et al. | |
| 2008/0075408 A1 | 3/2008 | Cho et al. | |
| 2008/0253423 A1 | 10/2008 | Kopp | |
| 2008/0267557 A1 | 10/2008 | Wang et al. | |
| 2009/0110354 A1 | 4/2009 | Sutherland | |
| 2009/0226130 A1 | 9/2009 | Doany et al. | |
| 2010/0061683 A1 | 3/2010 | Sasaki | |
| 2010/0202732 A1 | 8/2010 | Sameshima et al. | |
| 2010/0310214 A1 | 12/2010 | Miyadera et al. | |
| 2012/0020621 A1 | 1/2012 | Zhou | |
| 2012/0089180 A1 | 4/2012 | Fathi et al. | |
| 2012/0163811 A1 * | 6/2012 | Doany et al. | 398/41 |
| 2012/0207426 A1 | 8/2012 | Doany et al. | |
| 2012/0219255 A1 | 8/2012 | Bradley et al. | |
| 2012/0275748 A1 | 11/2012 | Yamaguchi et al. | |
| 2013/0156365 A1 | 6/2013 | Barwicz et al. | |
| 2013/0209027 A1 * | 8/2013 | Yu et al. | 385/14 |
| 2014/0119689 A1 * | 5/2014 | Yabre et al. | 385/14 |
| 2014/0177222 A1 * | 6/2014 | Barwicz et al. | 362/249.01 |
| 2014/0177625 A1 * | 6/2014 | Chang et al. | 370/351 |
| 2014/0179034 A1 * | 6/2014 | Barwicz et al. | 438/26 |
| 2014/0270784 A1 * | 9/2014 | Thacker et al. | 398/115 |

FOREIGN PATENT DOCUMENTS

| | | |
|---|---|---|
| JP | 5063419 A | 3/1993 |
| JP | 2005189730 A | 7/2005 |
| JP | 2007333982 A | 12/2007 |
| JP | 2012137538 A | 7/2012 |
| KR | 20090001169 U | 2/2009 |

OTHER PUBLICATIONS

B. G. Lee et al., "20-um-pitch eight-channel monolithic fiber array coupling 160 Gb/s/channel to silicon nanophotonic chip," 2010 Conference on Optical Fiber Communication (OFC), collocated National Fiber Optic Engineers Conference, (OFC/NFOEC), Mar. 21-25, 2010, paper PDPA4, 3 pages.

Barwicz, et al., "Fiber to Wafer Interface," U.S. Appl. No. 13/331,164, filed Dec. 12, 2011; not yet published.

Barwicz et al. "Flexible Fiber to Wafer Itnerface," U.S. Appl. No. 13/428,277, filed Mar. 23, 2012, not yet published.

Booth et al., "Polyguide(tm) Polymeric Technology for Optical Interconnect Circuits and Components," Proc. SPIE, vol. 3005, 1997, pp. 238-251.

Lee et al., "20-um-Pitch Eight-Channel Monolithic Fiber Array Coupling 160 Gb/s/Channel to Silicon Nanophotonic Chip," 2010 Conference on Optical Fiber Communication (OFC), collocated National Fiber Optic Engineers Conference, (OFC/NFOEC), Mar. 21-25, 2010, paper PDPA4, 3 pages.

OZ Optics, "V-Groove Assemblies," Datasheet DTS0083, Mar. 19, 2009, http://www.ozoptics.com/ALLNEW_PDF/DTS0083.pdf, downloaded Aug. 3, 2011.

Thacker et al., "Flip-Chip Integrated Silicon Photonic Bridge Chips for Sub-Picojoule Per Bit Optical Links", Proceedings 60th Electronic Compoennts and Technology Conference (ECTC), Jun. 1-4, 2010, pp. 240-243.

Wang et al., "Ge-photodetectors for Si-Based Optelectronic Integration", Sensors, vol. 11, No. 1, 2011, pp. 696-718.

Tymon Barwicz, et al., "Dual-Polymer Fiber Optic Interface With Melt-Bond Adhesive," Related Application, U.S. Appl. No. 14/327,140, filed Jul. 9, 2014, pp. 1-29.

Tymon Barwicz, et al., "Fiber Optic Interface With Adhesive Fill System," Related Application, U.S. Appl. No. 14/327,117, filed Jul. 9, 2014, pp. 1-28.

Tymon Barwicz, et al., "Material Structures for Front-End of the Line Integration of Optical Polarization Splitters and Rotators," Related Application, U.S. Appl. No. 13/835,725, filed Mar. 15, 2013, pp. 1-27.

Tymon Barwicz, et al., "Material Structures for Front-End of the Line Integration of Optical Polarization Splitters and Rotators," Related Application, U.S. Appl. No. 13/971,390, filed Aug. 20, 2013, pp. 1-25.

A. Kumar et al, "Birefringence of optical fiber pressed into a V groove," Optics Letters, vol. 6, Issue 12, 1981, pp. 644-646.

OZ Optics, "V-Groove Assemblies," Datasheet DT30083, Mar. 19, 2009, http://www.ozoptics.com/ALLNEW_PDF/DTS0083.pdf, downloaded Aug. 3, 2011; 8 pages.

Tymon Barwicz, et al., "Fiber Pigtail With Integrated Lid," Related Application, U.S. Appl. No. 13/804,269, filed Mar. 14, 2013, pp. 1-29.

\* cited by examiner

SEMICONDUCTOR PHOTONIC PACKAGE

CROSS REFERENCE TO RELATED APPLICATIONS

The present application is a continuation of U.S. patent application Ser. No. 13/721,833, entitled "SEMICONDUCTOR PHOTONIC PACKAGE", filed on Dec. 20, 2012, which is incorporated herein by reference in its entirety.

FIELD OF INVENTION

The present invention relates generally to packaging semiconductor dies, and more specifically, to semiconductor dies having both optical input and outputs and electrical inputs and outputs.

DESCRIPTION OF RELATED ART

Semiconductor devices having optical input and outputs have often been used in telecommunications devices. The packaging of such devices has been expensive compared to the packaging of semiconductor devices having electrical inputs and outputs. As nanophotonic semiconductor devices have become more prevalent, efficient and economical packaging and packaging processes are desired.

BRIEF SUMMARY

According to an exemplary embodiment of the present invention, a method for assembling a semiconductor photonic package device includes bonding a portion of a first surface of a semiconductor die portion to a portion of a carrier portion, bonding a single mode optical ferrule portion to a portion of the first surface of the semiconductor die portion, and disposing a cover plate assembly in contact with the optical ferrule portion and the carrier portion.

According to another exemplary embodiment of the present invention, a semiconductor photonic package device includes a carrier portion having a first planar surface and a cavity communicative with the first planar surface, a semiconductor die portion having a first planar surface, the first planar surface of the semiconductor die portion disposed on the first planar surface of the carrier portion, and a single mode optical ferrule portion partially disposed on the first planar surface of the semiconductor die portion, and comprising a cover portion arranged in contact with the first planar surface of the optical ferrule portion.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The embodiments described herein offer methods and resultant structures that include packaging of micro and nano fabricated semiconductor dies having both optical and electrical inputs and outputs.

Figure 1A:
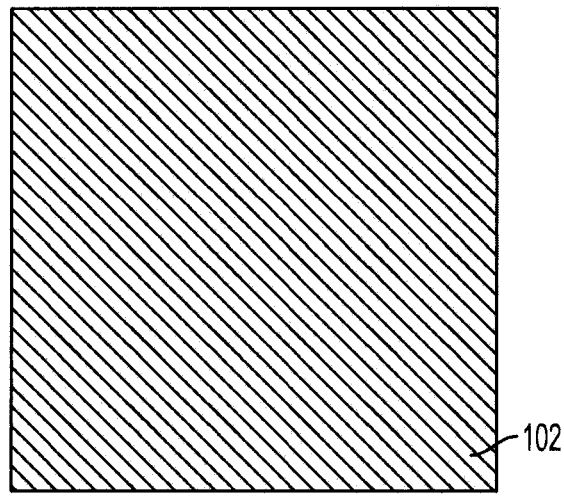
FIG. 1A illustrates a bottom view of a semiconductor die portion.
Figure 1B:
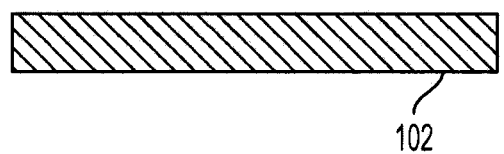
FIG. 1B illustrates a side view of the semiconductor die portion.
Figure 1C:
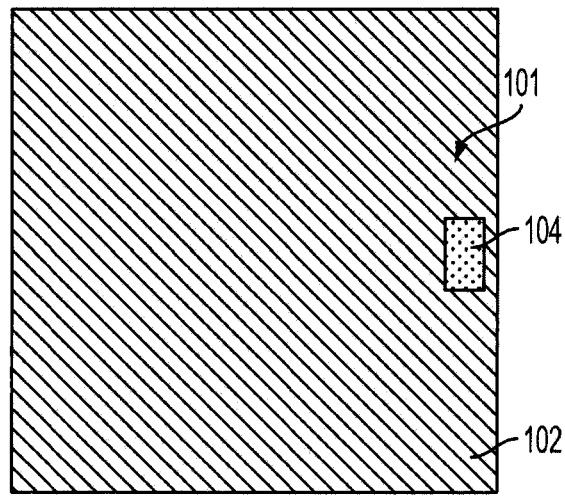
FIG. 1C illustrates a bottom view of a semiconductor die portion and a laser die portion.
Figure 1D:
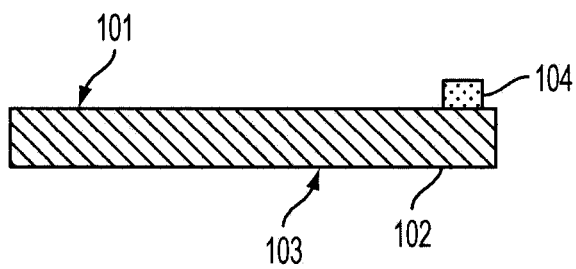
FIG. 1D illustrates a side view of the laser die portion bonded to the semiconductor die portion.

FIG. 1A illustrates a bottom view of a semiconductor die portion 102. FIG. 1B illustrates a side view of the semiconductor die portion 102. FIG. 1C illustrates a bottom view of a semiconductor die portion 102 and a laser die portion 104 that is bonded to recess arranged in a first substantially planar surface 101 of the semiconductor die portion 102. The semiconductor die portion 102 includes a second substantially planar surface 103 opposing and arranged substantially parallel to the first surface 101. The semiconductor die portion 102 is a portion of a semiconductor material substrate such as, for example, a silicon or a germanium material. The semiconductor die portion 102 may have a thickness of approximately 50 microns (µm) to 3 millimeters (mm) and preferably between 500 µm and 1 mm. The width and length of the semiconductor die portion 102 are approximately 1 mm to 35 mm and preferably between 5 mm to 10 mm. The first surface 101 may include nanostructures that include, for example, electronic devices and waveguides. The laser die portion 104 includes a substrate that includes a III-V material such as, for example, InP or GaAs with a micro or nanostructure that includes a waveguiding structure and a coherent infrared light generating structure. The coherent infrared light includes a wavelength between 800 nanometers (nm) and 1700 nm and preferably between 1200 nm and 1650 nm. The laser die portion 104 is bonded to a first substantially planar surface 101 of the semiconductor die portion 102 using, for example, a flip-chip bonding process. The flip-chip bonding process forms an electrical connection between conductive contacts on the semiconductor die portion 102 and the laser die portion 104 by arranging conductive solder pads or solder bumps (not shown) on the semiconductor die portion 102 in contact with corresponding conductive solder pads or solder bumps on the laser die portion 104 and affecting the reflow of the solder to result in an electrical and mechanical connection between the corresponding solder on the semiconductor die portion 102 and the laser die portion 104. The flip-chip bonding process may include a flux dispense process when some solders are used. Following the flip-chip bonding process, an underflow and cure of a suitable non-conductive material such as an adhesive that may include, for example an optically transparent adhesive (described below) may be performed to affect a mechanical bond between the semiconductor die portion 102 and the laser die portion 104. The laser die portion 104 and the semiconductor die portion 102 are optically coupled by, for example, a butt coupling or an adiabatic coupling that is defined by waveguide features arranged on the surface 101 of the semiconductor die portion 102 and corresponding features on the laser die portion 104. An optical under fill may be formed between the semiconductor die portion 102 and the laser die portion 104 that improves optical coupling between the semiconductor die portion 102 and the laser die portion 104 and improves the mechanical strength of the arrangement. The FIG. 1D illustrates a side view of the laser die portion 104 bonded to the semiconductor die portion 102.

Figure 2A:
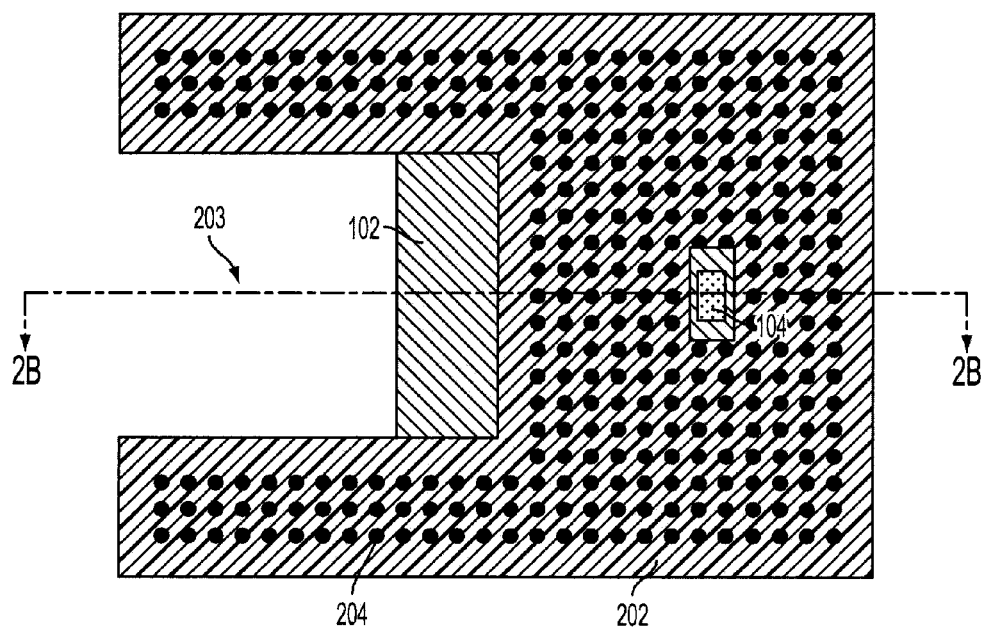
FIG. 2A illustrates a bottom view of the resultant structure following the bonding of the semiconductor die portion to a carrier portion.
Figure 2B:
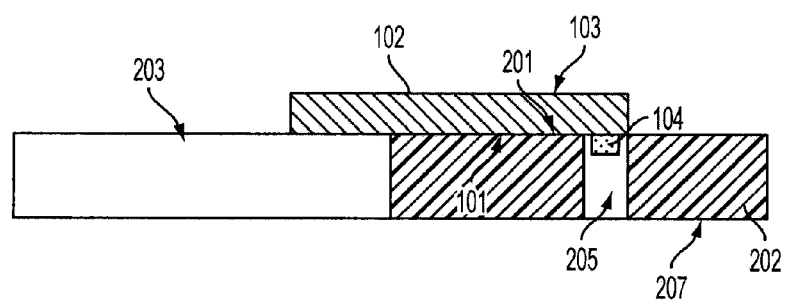
FIG. 2B illustrates a cut away view along the line 2B of FIG. 2A.

FIGS. 2A and 2B illustrate, respectively, a bottom view and a cut away view along line 2B of the resultant structure following the bonding of the first surface 101 of the semiconductor die portion 102 to a first substantially planar surface 201 of a carrier portion 202. The semiconductor die portion 102 may be bonded to the carrier portion 202 using a suitable bonding process such as, for example, a flip-chip bonding process similar to the process described above. The carrier portion 202 includes a cut out portion 203 that exposes a portion of the first surface 101 of the semiconductor die portion 102 following the bonding process. The carrier portion 202 includes a cavity 205 that may include a recess or an orifice that is communicative with the first surface 201 of the carrier portion 202 and a second substantially planar surface 207 of the carrier portion 202. The cavity 205 is operative to receive the laser die portion 104 such that the surface 101 of the semiconductor die portion 102 may be arranged substantially parallel to the surface 201 of the carrier portion 202. The carrier portion 202 includes, for example, a polymeric substrate with conductive contacts arranged on the surface 201 that correspond to conductive contacts arranged on the surface 101 of the semiconductor die portion 102. The carrier portion includes conductive contacts 204 that are arranged on the surface 207 of the carrier portion 202. The conductive contacts 204 may be connected to corresponding contacts on, for example, a printed circuit board (not shown) such that the assembly may be connected to the printed circuit board.

Figure 3A:
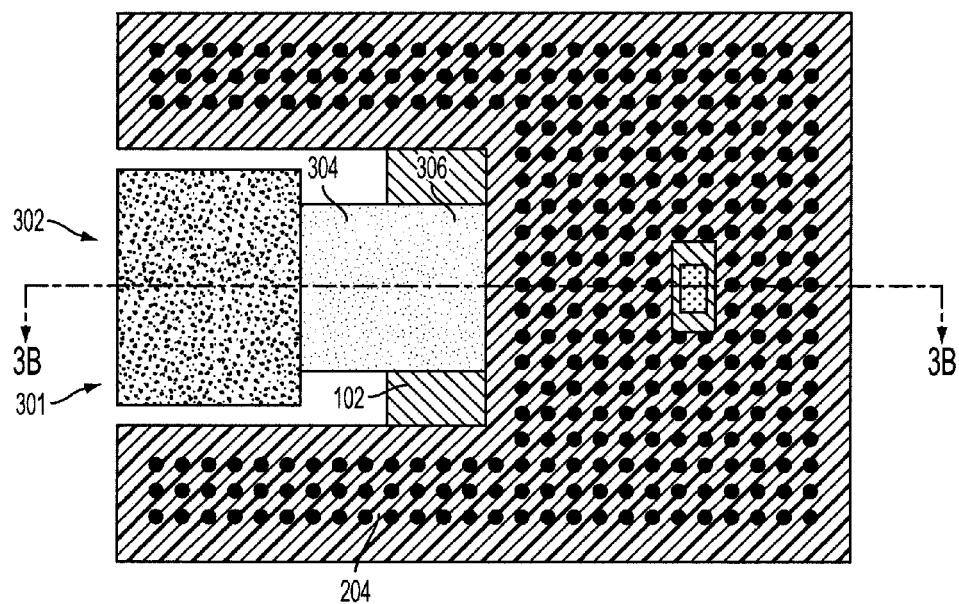
FIG. 3A illustrates a bottom view of the resultant assembly following the deposition of a single mode optical ferrule.
Figure 3B:
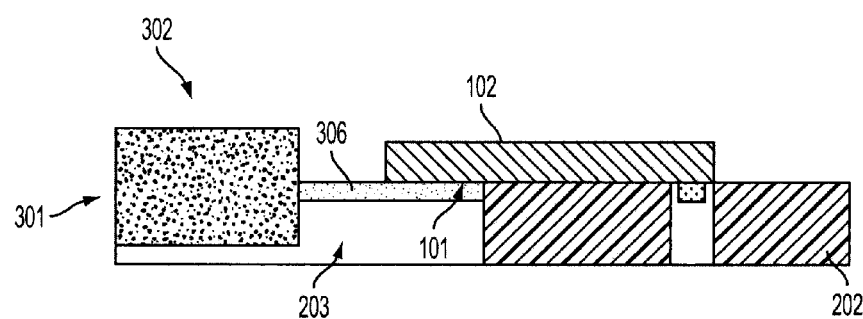
FIG. 3B illustrates a cut away view along the line 3B of FIG. 3A.

FIG. 3A illustrates a bottom view of the resultant assembly following the deposition of a single mode optical ferrule 302 on the surface 101 of the semiconductor die portion 102. In this regard, the optical ferrule 302 contains polymer and single-mode optical waveguides. A single-mode optical waveguide is a waveguide that can guide only one transverse electric mode and one transverse magnetic mode. The optical waveguides may include optical fibers or polymer waveguides. The optical waveguides extend in the ferrule from distal end 301 to the silicon die. The optical waveguides are placed within the ferrule at pre-determined positions at distal end 301 for connection to one optical fiber or an array of optical fibers. For example, an even number of optical waveguides may be positioned at distal end 301 on a plane substantially parallel to 101 with a spacing of 250 um between waveguide centers. In such arrangement, the waveguide position may be compatible with an MT or MPO optical connector standard known by people of skill in the art. The ferrule may include mechanical interfacing structures to align and secure in position at distal end 301 a compatible optical fiber connector with compatible optical and mechanical interface to the said ferrule. An example of such interfacing structure is a pair of holes or pins as in the MT or the MPO optical connector standard know to people of skill in the art. The said optical waveguides interface optically in region 306 to waveguide features arranged on the semiconductor die portion 102. The optical ferrule portion 302 is at least partially arranged in the cut out portion 203 of the carrier portion 202. The optical ferrule 302 includes a waveguide interface portion 306 that may include optical fiber or polymer waveguide that is bonded or connected to a portion of the semiconductor die portion 102 to affect an optical butt coupling or an adiabatic coupling between the semiconductor die portion 102 and the waveguide interface portion 306. The waveguide interface portion 306 may be bonded to the semiconductor die portion 102 by, for example, an optical adhesive disposed therebetween that has a transparency in the infrared wavelength spectrum that the laser die portion 104 operates in. The optical loss in the spectrum for the optical adhesive is below 20 dB/cm and preferably below 5 dB/cm. The ferrule is between approximately 1 mm to 2 mm in height, 2 mm to 6.4 mm in width, and 3 mm to 15 mm in length. The bonding process may include, for example, the deposition of the optical adhesive on a portion of the semiconductor die portion 102 and/or the waveguide interface portion 306. The optical ferrule portion 302 is arranged on the semiconductor die portion 102, and the optical adhesive is cured. The curing may be performed with, for example, ultra violet (UV} light, with thermal treatment, or both. An under fill process may be performed following the curing of the optical adhesive to affect a mechanical connection between the semiconductor die portion 102 and the carrier portion 202 and, in some embodiments, the optical ferrule portion 302 and the semiconductor die portion 102. FIG. 3B illustrates a cut away view along the line 3B (of FIG. 3A).

Figure 4A:
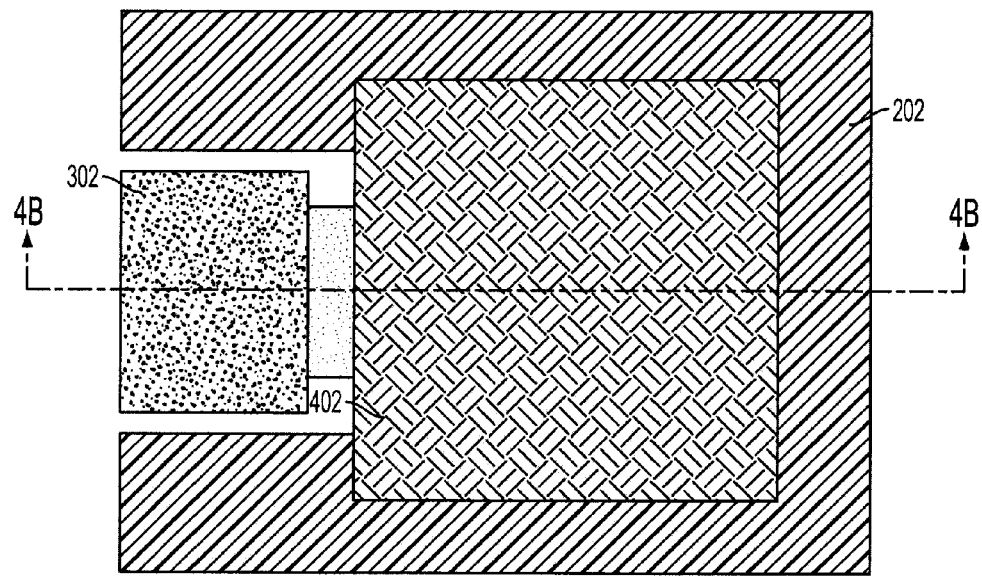
FIG. 4A illustrates a top view following the deposition of a heat spreader portion.
Figure 4B:
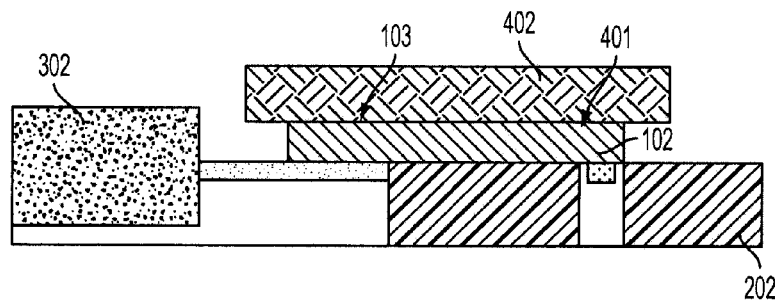
FIG. 4B illustrates a cut away view along the line 4B of FIG. 4A.

FIG. 4A illustrates a top view following the deposition of a heat spreader portion 402 on the surface 103 of the semiconductor die portion 102. The heat spreader portion 402 includes a thermally conductive material such as, for example a metallic material. The heat spreader portion 402 may be disposed by applying a thermal interface material (not shown) on a portion of the heat spreader portion 402 and/or the surface 103 of the semiconductor die portion 102. The heat spreader portion 402 is arranged on the surface 103 of the semiconductor die portion 102 and the thermal interface material is cured. In some exemplary embodiments, the heat spreader portion 402 may be mechanically connected to the carrier portion 202 with, for example, an adhesive disposed therebetween. The heat spreader portion 402 is optional and may be included in some exemplary embodiments as desired. FIG. 4B illustrates a cut away view along the line 4B (of FIG. 4A).

Figure 5A:
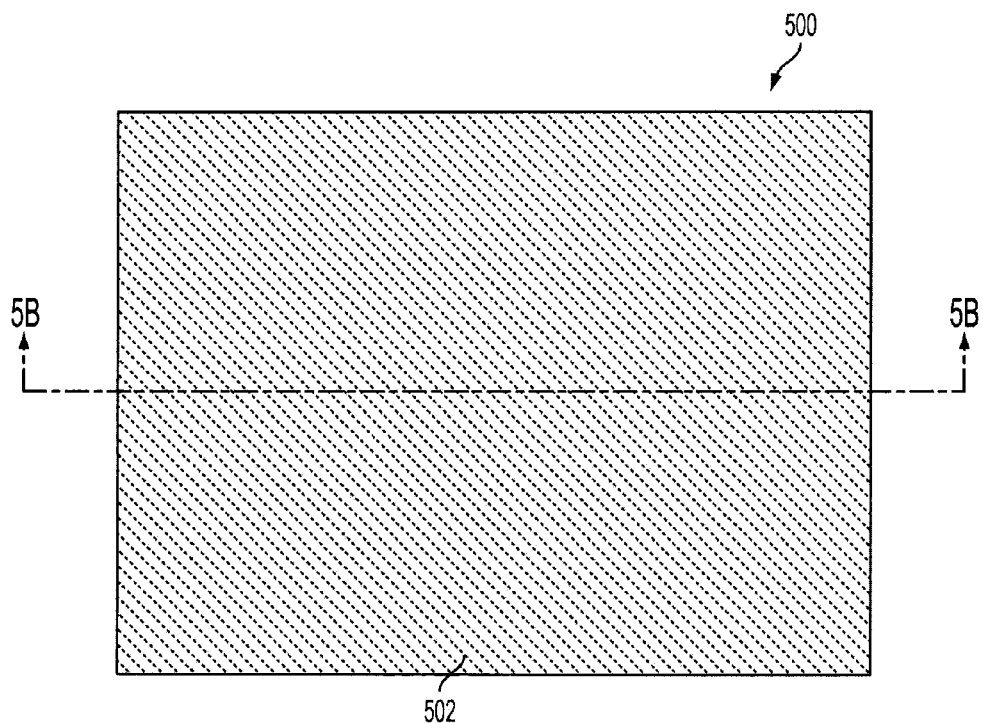
FIG. 5A illustrates a top view of an exemplary embodiment of an assembly
Figure 5B:
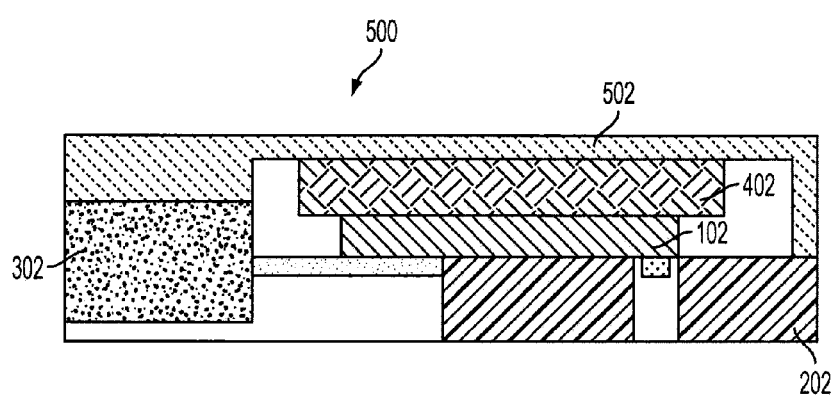
FIG. 5B illustrates a cut away view along the line 5B of FIG. 5A.

FIG. 5A illustrates a top view of an exemplary embodiment of an assembly 500 following the deposition of a cover plate assembly 502 on the surface 401 of the heat spreader portion 402. FIG. 5B illustrates a cut away view along the line 5B (of FIG. 5A). Referring to FIG. 5B, the cover plate assembly 502 may be disposed on the device by, for example, applying an adhesive to the surface 401 of the heat spreader portion 402 and/or a surface of the cover plate assembly 502. An adhesive may also be applied such that the adhesive is disposed between the cover plate assembly 502 and a portion of the optical ferrule 302 and a portion of the carrier portion 202. The cover plate assembly 502 may be fabricated from, for example, a plastic or polymer material, or in some embodiments a thermal conductive material such as a metallic material. The cover plate assembly 502 may include mechanical features such as, for example, latches to provide a mechanical connection between the cover plate assembly 502 and an optical fiber connector. In one embodiment the coverplate include a through-hole in which the heat spreader fits for direct contact between the heat spreader and an external device such as a heat sinking device.

Figure 6A:
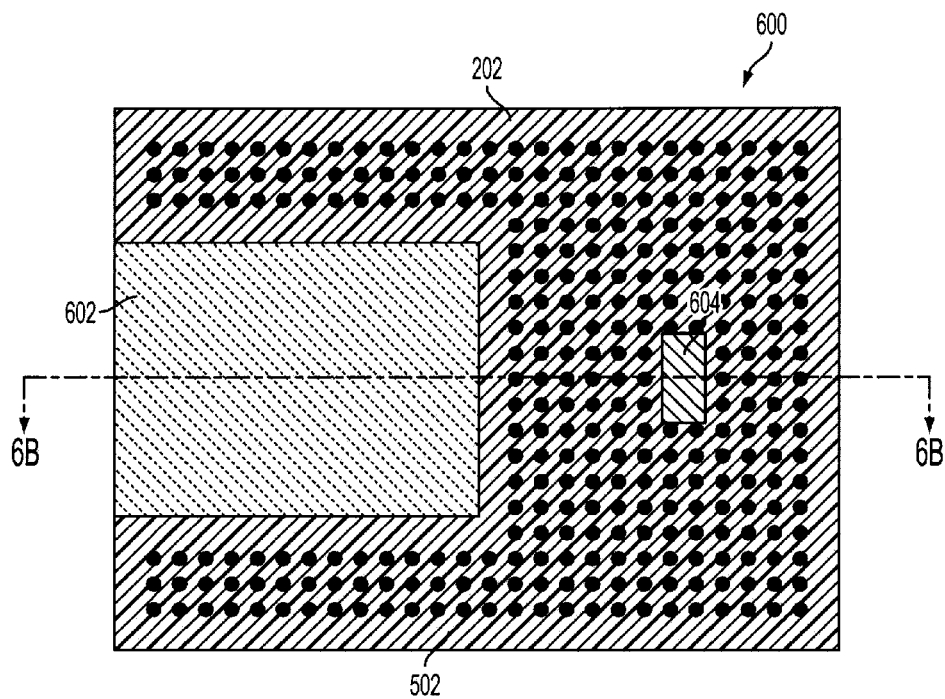
FIG. 6A illustrates a bottom view of an alternate exemplary embodiment of an assembly.
Figure 6B:
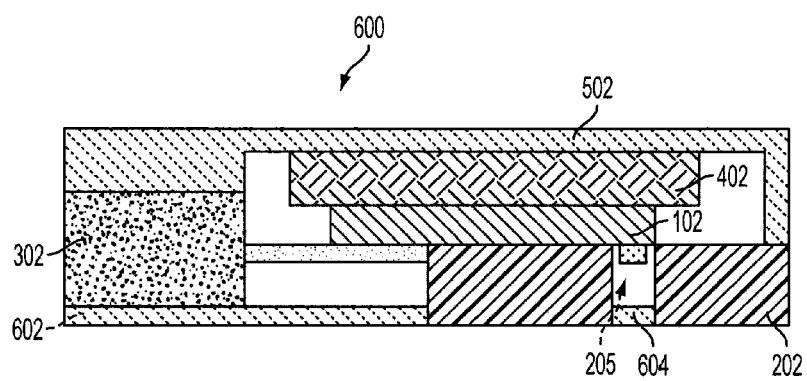
FIG. 6B illustrates a cut away view along the line 6B of FIG. 6A.

FIG. 6A illustrates a bottom view of an alternate exemplary embodiment of an assembly 600. The assembly 600 is similar to the assembly 500 described above, and includes a bottom cover portion 602 that is arranged over the optical ferrule portion 302. The bottom cover portion 602 may include, for example, a plastic, polymer, or metallic component that is secured to the assembly 600 using, for example, a mechanical or adhesive bonding means. Alternatively, the bottom cover portion 602 may be formed from a polymer that is applied and cured to form a rigid or semi-rigid bottom cover portion 602. A laser cover portion 604 may be arranged to fill or cover a portion of the cavity 205. The laser cover portion 602 may be fabricated using, for example, a similar method as described above regarding the fabrication and deposition of the bottom cover portion 602. FIG. 6B illustrates a cut away view along the line 6B (of FIG. 6A).

Figure 7A:
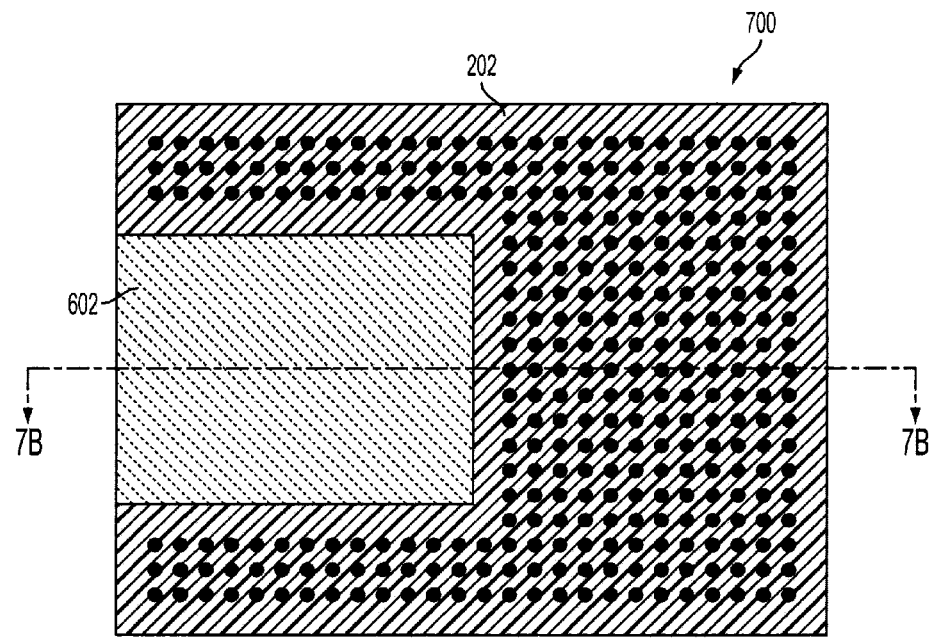
FIG. 7A illustrates a bottom view of an alternate exemplary embodiment of an assembly.
Figure 7B:
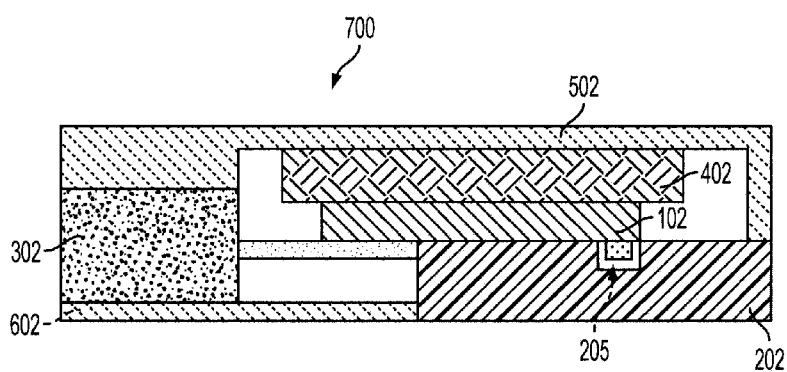
FIG. 7B illustrates a cut away view along the line 7B of FIG. 7A.

FIG. 7A illustrates a bottom view of an alternate exemplary embodiment of an assembly 700. The assembly 700 is similar to the assembly 500 described above, and includes a bottom cover portion 602 that is arranged over the optical ferrule portion 302. In this regard, the cavity 205 does not pass through the semiconductor die portion 205. The FIG. 7B illustrates a cut away view along the line 7B (of FIG. 7A).

Figure 8A:
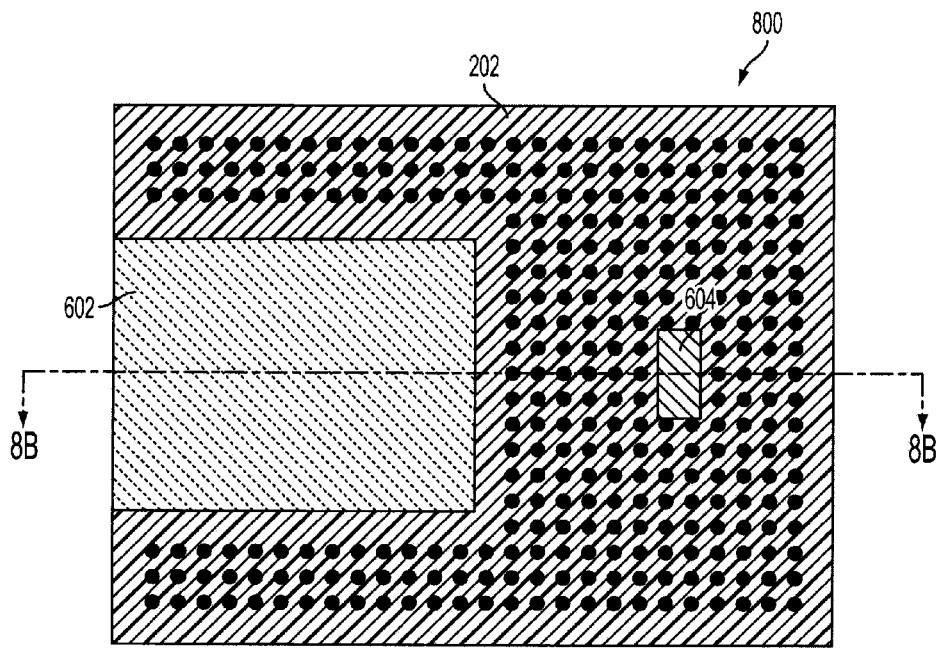
FIG. 8A illustrates a bottom view of an alternate exemplary embodiment of an assembly.
Figure 8B:
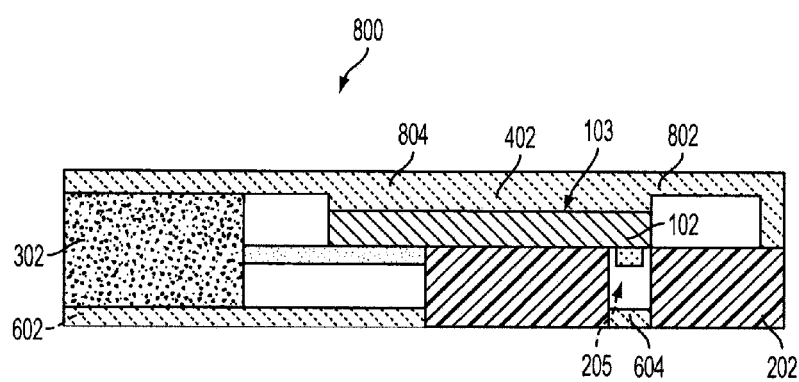
FIG. 8B illustrates a cut away view along the line 8B of FIG. 8A.

FIG. 8A illustrates a bottom view of an alternate exemplary embodiment of an assembly 800. The assembly 800 is similar to the assembly 500 described above, and includes a bottom cover portion 602 that is arranged over the optical ferrule portion 302. FIG. 8B illustrates a cut away view along the line 8B (of FIG. 8A). Referring to FIG. 8B, the assembly 802 does not include a separate heat spreader portion 402 (of FIG. 4). In the illustrated embodiment, the cover plate assembly 802 may contact the surface 103 of the semiconductor die portion 102 and may include a heat spreader portion 804 integrated with the cover plate assembly 802. A thermal interface material (not shown) may disposed between the surface 103 of the semiconductor die portion 102 and the heat spreader portion 804 of the cover plate assembly 802. The cover plate assembly 802 may include mechanical features such as, for example, latches to provide a mechanical connection between the cover plate assembly 502 and an optical fiber connector.

The exemplary embodiments described herein provide a method for fabrication and a resultant device that includes a laser die and a semiconductor die packaged having an optical and an electrical connection in an integrated package. The fabrication methods and components used in fabrication offer an economical and efficient process and an economical resultant device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for assembling a semiconductor photonic package device, the method comprising:
   bonding a portion of a first surface of a semiconductor die portion to a portion of a carrier portion;
   bonding a single mode optical ferrule portion to a portion of the first surface of the semiconductor die portion;
   disposing a cover plate assembly in contact with the optical ferrule portion and the carrier portion;
   bonding a laser die portion to the first surface of the semiconductor die portion prior to bonding the portion of the first surface of the semiconductor die portion to the portion of the carrier portion;
   wherein the carrier portion defines a cavity operative to receive a portion of the laser die portion;
   wherein the cavity is communicative with a first surface and a second surface of the carrier portion;
   disposing a cover that partially fills the cavity proximate to the second surface.

2. The method of claim 1, wherein the bonding of the laser die portion to the first surface of the semiconductor die portion includes a flip-chip process.

3. The method of claim 1, wherein the bonding of portion of the first surface of the semiconductor die portion to the carrier portion includes a flip-chip process.

4. The method of claim 1, wherein the method further comprises disposing a heat spreader portion on a second surface of the semiconductor die portion, wherein the second surface of the semiconductor die portion opposes the first surface of the semiconductor die portion.

5. The method of claim 1, wherein the optical ferrule portion includes a waveguide interface portion partially defining an optical adiabatic coupling with the semiconductor die portion.

6. The method of claim 1, wherein the optical ferrule portion includes a waveguide interface portion partially defining an optical butt coupling with the semiconductor die portion.

7. The method of claim 1, wherein the carrier portion includes an organic material.

8. The method of claim 1, wherein the method further comprises, disposing a cover to an exposed portion of the optical ferrule portion.

9. The method of claim 1, wherein the cover plate assembly contacts a portion of the semiconductor die portion.

10. The method of claim 1, wherein the optical ferrule portion is a single mode optical ferrule.

* * * * *